United States Patent
Hou

(10) Patent No.: US 11,243,153 B2
(45) Date of Patent: *Feb. 8, 2022

(54) HOSE FATIGUE RESISTANCE EVALUATION SYSTEM

(71) Applicant: THE YOKOHAMA RUBBER CO., LTD., Tokyo (JP)

(72) Inventor: Gang Hou, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/277,132

(22) PCT Filed: Jul. 26, 2019

(86) PCT No.: PCT/JP2019/029446
§ 371 (c)(1),
(2) Date: Mar. 17, 2021

(87) PCT Pub. No.: WO2020/059303
PCT Pub. Date: Mar. 26, 2020

(65) Prior Publication Data
US 2021/0318215 A1    Oct. 14, 2021

(30) Foreign Application Priority Data
Sep. 18, 2018 (JP) .............................. JP2018-173942

(51) Int. Cl.
*G01N 3/12* (2006.01)
*G01N 3/06* (2006.01)

(52) U.S. Cl.
CPC .............. *G01N 3/12* (2013.01); *G01N 3/066* (2013.01); *G01N 3/068* (2013.01);
(Continued)

(58) Field of Classification Search
CPC .......... G01N 3/12; G01N 3/068; G01N 3/066; G01N 2203/0694; G01N 2203/0048;
(Continued)

(56) References Cited

U.S. PATENT DOCUMENTS 4,591,996 A * 5/1986 Vachon ..................... G01L 1/24
356/35.5
5,339,677 A    8/1994 Haug
(Continued)

FOREIGN PATENT DOCUMENTS

CN    104007007 A    8/2014
CN    204255303 U    4/2015
(Continued)

OTHER PUBLICATIONS

JIS (Japanese Industrial Standard) K 6330-8: 1998 (E), "Testing methods for rubber and plastics hoses—Part 8: Hydraulic-pressure impulse test without flexing", first English edition published in Oct. 1999.

*Primary Examiner* — Marrit Eyassu
(74) *Attorney, Agent, or Firm* — Carrier Blackman & Associates, P.C.; Joseph P. Carrier; Anne G. Sabourin

(57) ABSTRACT

A hose to be evaluated is installed on a fixing frame in a preset shape, and a strain gauge and markers are attached to a surface of the hose. During a course of application of predetermined internal pressure to the hose, strain data is acquired using the strain gauge and an image of an external shape of the hose is captured using a camera device to acquire image data. Based on the strain data and the image data acquired, a change in the shape of the hose between a plurality of time points at identical internal pressure is determined. Such hose fatigue resistance evaluation system
(Continued)

can determine changes in the degree of deformation of a hose over time due to repeated application of internal pressure.

20 Claims, 8 Drawing Sheets

(52) U.S. Cl.
CPC ............... *G01N 2203/0016* (2013.01); *G01N 2203/0048* (2013.01); *G01N 2203/0274* (2013.01); *G01N 2203/0617* (2013.01); *G01N 2203/0647* (2013.01); *G01N 2203/0694* (2013.01)

(58) Field of Classification Search
CPC ... G01N 2203/0647; G01N 2203/0274; G01N 2203/0617; G01N 2203/0016; G01N 2203/028; G01N 2203/0623
USPC .......................................................... 73/774
See application file for complete search history.

(56) References Cited

U.S. PATENT DOCUMENTS

| 9,523,521 | B2 | 12/2016 | Awa et al. |
| 2010/0007325 | A1* | 1/2010 | Stark ...................... F16L 11/127 324/71.1 |
| 2010/0106461 | A1* | 4/2010 | Keast ................. G05B 23/0283 702/183 |

FOREIGN PATENT DOCUMENTS

| DE | 10 2010 023 727 | A1 | 12/2011 | |
| DE | 102016223900 | A1 * | 6/2018 | ............... G01N 3/20 |
| JP | H04-203950 | A | 7/1992 | |
| JP | H08-159940 | A | 6/1996 | |
| JP | 2003-232688 | A | 8/2003 | |
| JP | 2005-299727 | A | 10/2005 | |
| JP | 2007-263908 | A | 10/2007 | |
| JP | 2007263908 | A * | 10/2007 | |
| JP | 2014-206361 | A | 10/2014 | |
| RU | 2187794 | C2 | 8/2002 | |

* cited by examiner

HOSE FATIGUE RESISTANCE EVALUATION SYSTEM

TECHNICAL FIELD

The present invention relates to a hose fatigue resistance evaluation system and particularly relates to a hose fatigue resistance evaluation system that can determine changes in the degree of deformation of a hose over time due to repeated application of internal pressure.

BACKGROUND ART

High-pressure rubber hoses and the like are repeatedly subjected to correspondingly high internal pressure during use and thus require excellent fatigue resistance. In the related art, for evaluation of the fatigue resistance of a hose, a method is known in which the hose is checked for a failure after predetermined internal pressure is repeatedly applied to the hose for a designated number of times (for example, see paragraph 0050 of Patent Document 1). In other words, in an evaluation method based on an impact pressure test specified in JIS K 6330-8, how the hose is deformed during the course of fatigue and how the deformation progresses are unable to be determined. For improved fatigue resistance of the hose, determining such characteristics of the hose is useful, and thus the evaluation method has room for further improvement.

CITATION LIST

Patent Literature

Patent Document 1: JP 2014-206361 A

SUMMARY OF INVENTION

Technical Problem

An object of the present invention is to provide a hose fatigue resistance evaluation system that can determine changes in the degree of deformation of a hose over time due to repeated application of internal pressure.

Solution to Problem

In order to achieve the above object, a hose fatigue resistance evaluation system includes a fixing frame on which a hose to be evaluated is fixed and installed in a preset shape; and a pressurization mechanism repeatedly applying predetermined internal pressure to the hose, and the hose fatigue resistance evaluation system further includes a strain gauge and a marker attached to a surface of the hose; a camera device capturing an image of an external shape of the hose; and a calculation unit into which strain data acquired by the strain gauge and image data acquired by the camera device are input, and based on the strain data and the image data, the calculation unit is configured to calculate a degree of deformation of a shape of the hose between a plurality of time points at identical internal pressure.

Advantageous Effects of Invention

According to an embodiment of the present invention, during the course of repeated application of the predetermined internal pressure to the hose with the strain gauge and markers attached to the surface of the hose, the strain data is acquired using the strain gauge and the image data regarding the external shape of the hose is acquired using the camera device, and based on the strain data and the image data, a change in the shape of the hose between a plurality of time points at the identical internal pressure is determined. Accordingly, changes in the degree of deformation of the hose over time due to repeated application of internal pressure can be determined.

DESCRIPTION OF EMBODIMENTS

Figure 1:
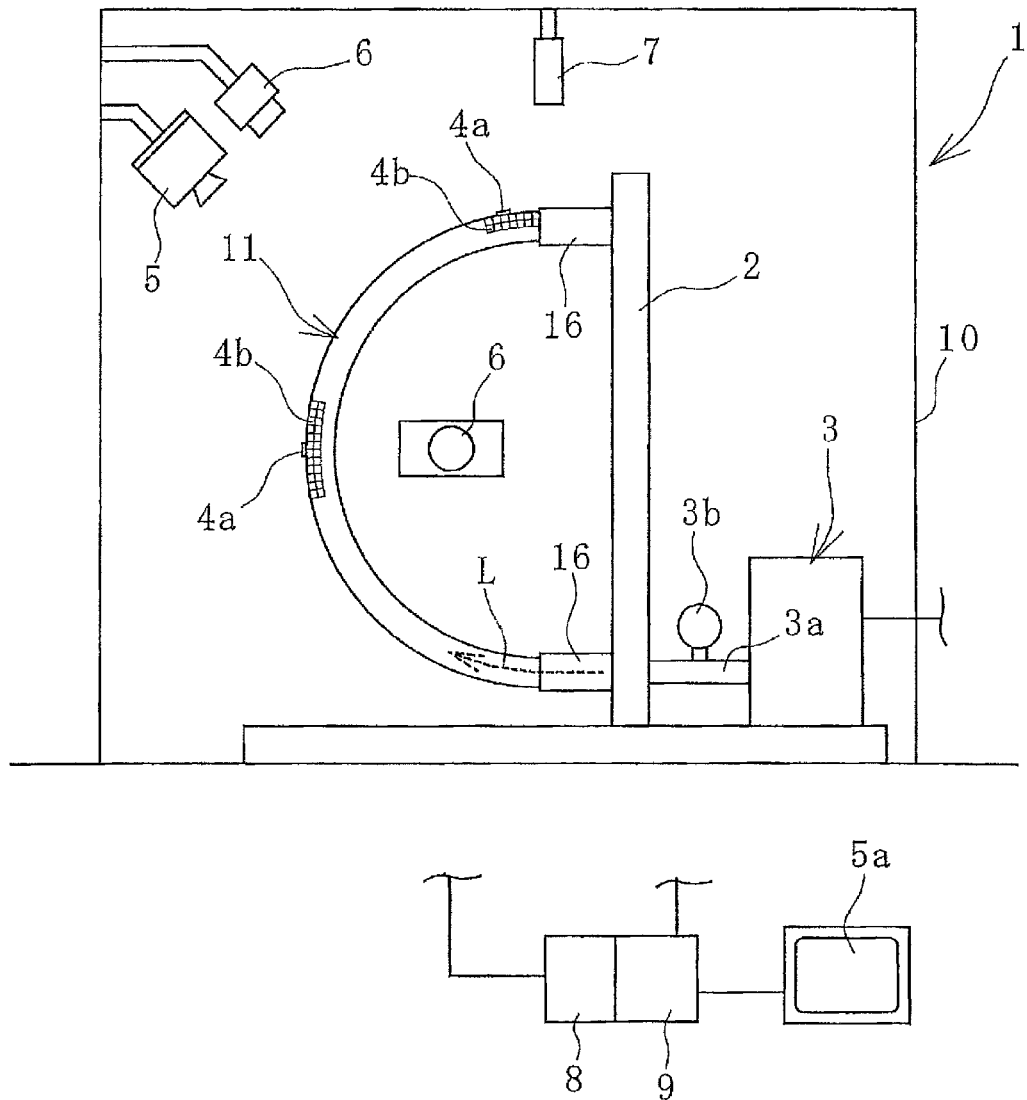
FIG. 1 is an explanatory diagram illustrating a fatigue resistance evaluation system according to the present invention in a side view.

A hose fatigue resistance evaluation system of the present invention will be described below based on an embodiment illustrated in the figures.

A hose fatigue resistance evaluation system 1 (hereinafter referred to as "evaluation system 1") of an embodiment of the present invention illustrated in FIGS. 1 to 2 includes: a fixing frame 2 on which a hose 11 to be evaluated, such as a hydraulic hose, is fixed and installed in a preset shape; a pressurization mechanism 3 that repeatedly applies predetermined internal pressure P to the hose 11; strain gauges 4a and markers 4b attached to the surface of the hose 11; a camera device 5; and a calculation unit 8. In this embodiment, the evaluation system 1 further includes a thermography 6, a temperature sensor 7, and a thermostatic chamber 10.

Figure 3:
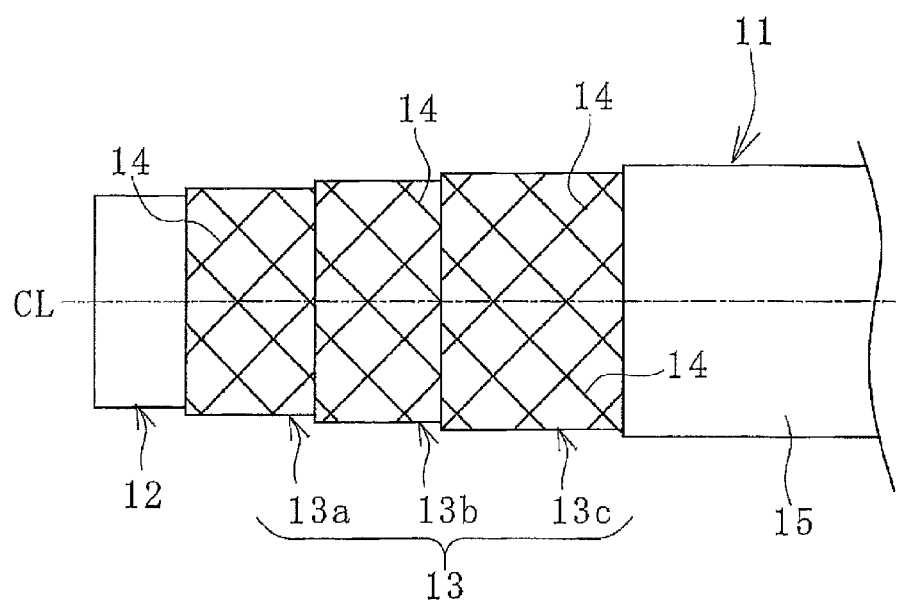
FIG. 3 is a partially cutaway explanatory diagram illustrating the internal structure of the hose in FIG. 1.

As illustrated in FIG. 3, the hose 11 has a structure in which an inner surface layer 12, a reinforcing layer 13 (13a, 13b, and 13c), and an outer surface layer 15 are coaxially layered in this order from an inner circumferential side. Note that a dot-dash line CL in the drawings represents a hose axis. The inner surface layer 12 and the outer surface layer 15 are formed from rubber, resin, or the like. The reinforcing layer 13 is formed by braiding reinforcing wires 14. As the reinforcing wires 14, any of various resin fibers such as aramid fibers, carbon fibers, and PBO fibers; or metal wires such as steel cords are used.

Figure 4:
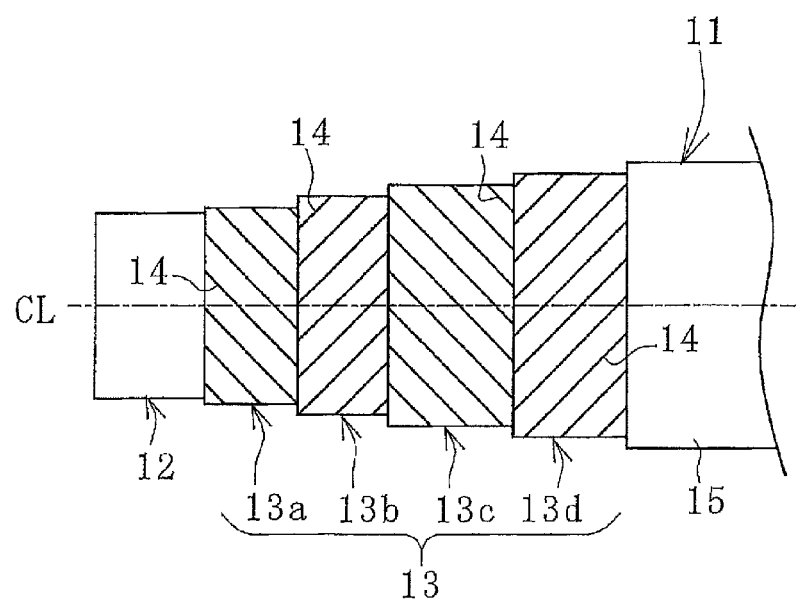
FIG. 4 is a partially cutaway explanatory diagram illustrating the internal structure of another hose.

As illustrated in FIG. 4, the reinforcing layer 13 (13a, 13b, 13c, and 13d) of the hose 11 may be formed of the reinforcing wires 14 wound in a spiral shape. In the structure of the reinforcing layer 3, the reinforcing wires 14, in the reinforcing layers 13 layered adjacent to each other in the radial direction, are set in the intersecting direction. The number of layers in the reinforcing layer 13 is set as appropriate according to the required performance of the hose 11.

Figure 2:
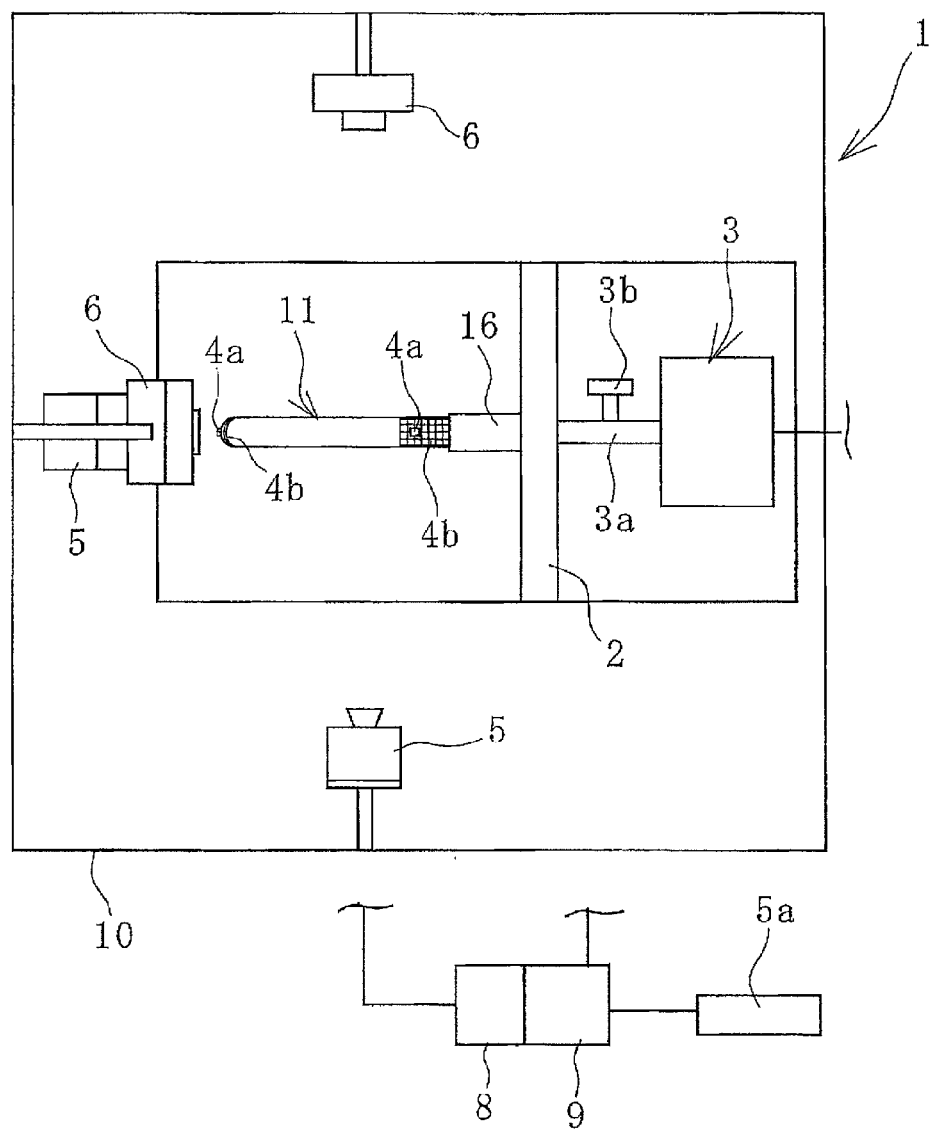
FIG. 2 is an explanatory diagram illustrating the evaluation system in FIG. 1 in a plan view.

As illustrated in FIGS. 1 and 2, in the evaluation system 1, a hose fitting 16 is attached to both end portions of the hose 11. For the hose fittings 16, hose fittings attached to the hose when the hose 11 is actually used are preferably used and attached to the hose 11 with an actual crimping force. The hose 11 is fixed to the fixing frame 2 via the hose fittings 16. In this embodiment, the hose fittings 16 attached to both the end portions of the hose 11 are each fixed to the fixing frame 2 to set up the hose 11 in an arcuate shape (semicircular shape).

The radius of curvature of the hose 11 in an arcuate shape is preferably a radius of curvature of the hose 11 in an actual use state or is smaller than the radius of curvature of the hose 11 in the actual use state. This radius of curvature is set 5 times to 15 times as large as the outer diameter of the hose 11, for example. The hose 11 can be fixed to the fixing frame 2 in a straight state (i.e., the radius of curvature is infinite) rather than in an arcuate shape. In this embodiment, a single hose 11 is installed on the fixing frame 2, but a plurality of hoses 11 may be installed on one fixing frame 2.

Figure 5:
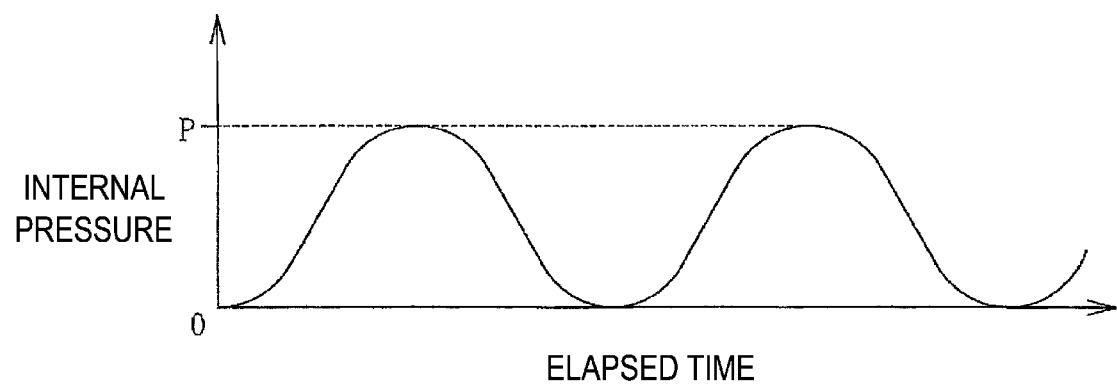
FIG. 5 is a graph showing application cycles of predetermined internal pressure.

A pipe 3a of the pressurization mechanism 3 is connected to one of the hose fittings 16, and the other hose fitting 16 is closed. The pressurization mechanism 3 includes a pressure sensor 3b on the pipe 3a. The pressurization mechanism 3 fills the inside of the hose 11 with a pressurized fluid L such as hydraulic oil, and repeatedly applies the predetermined internal pressure P to the hose 11. The predetermined internal pressure P is applied in a pressure waveform as illustrated in FIG. 5. In FIG. 5, the pressure waveform is a sine wave, but can be, for example, a triangular wave.

The pressure data detected by the pressure sensor 3b is sequentially input to the calculation unit 8 as the internal pressure applied to the hose 11. The operation of the pressurization mechanism 3 is controlled by a control unit 9. Accordingly, the magnitude of the predetermined internal pressure P, the duration of application, and the pressure application cycle are controlled by the control unit 9. For example, a single computer can be used as the calculation unit 8 and the control unit 9.

Each of the strain gauges 4a is attached to the hose 11 in a predetermined area of the surface of the hose 11. For example, the strain gauge 4a is preferably attached to a plurality of positions in the areas where the amount of deformation is relatively large when the predetermined internal pressure P is applied. The hose 11, which is made of rubber, is damaged by tensile deformation more critically than by compressive deformation, and thus the strain gauge 4a is preferably attached in such a manner as to allow the maximum tensile deformation (strain data) to be acquired. In this embodiment, the strain gauge 4a is attached to a radially outer surface of the hose 11 in the area of a longitudinally central portion and to the radially outer surface of the hose 11 in the area at or near each hose fitting 16.

The strain gauge 4a is connected to the calculation unit 8 through a lead wire. Thus, the strain data acquired by the strain gauge 4a is sequentially input to the calculation unit 8. The strain data acquired by the strain gauges 4a allows accurate determination of the degree of local deformation (amount of displacement and direction of deformation) in the areas (positions) where the strain gauges 4a are attached.

The markers 4b are attached to the surface of the hose 11. As the markers 4b, for example, markings in a color different from the color of the surrounding surface are used. As with the strain gauge 4a, the markers 4b are preferably attached to a plurality of positions in the areas where the hose 11 is subjected to a relatively large amount of deformation. The strain gauge 4a is preferably disposed in the areas where the markers 4b are attached to the surface of the hose 11. In this embodiment, the markers 4b in a mesh shape disposed spaced apart from one another at a predetermined pitch in the longitudinal direction and the radial direction of the hose 11 are attached to the surface of the hose 11.

The markers 4b are easily attached over wide areas or to multiple locations, and thus the degree of deformation (amount of displacement and direction of deformation) of the hose 11 can be determined over wider areas, based on the degree of deformation (degree of movement) of the markers 4b.

The camera device 5 acquires image data regarding the external shape of the hose 11. For example, a digital camera that can capture a still image or video is used as the camera device 5. The image data acquired by the camera device 5 is input to the calculation unit 8. The image data input to the calculation unit 8 is displayed on a monitor 5a. One or a plurality of camera devices 5 are installed. In this embodiment, two camera devices 5 are installed to allow acquisition of image data regarding the hose 11 in a side view and image data regarding the hose 11 in an upper front view. At least one of the camera devices 5 is used to acquire image data regarding the areas where the markers 4b are attached. A single camera device 5 can be installed, and the camera device 5 can be movable to a desired position with respect to the hose 11. The movement of the camera device 5 is preferably controlled by the control unit 9.

The thermography 6 acquires the surface temperature data regarding the hose 11 in a non-contact manner. The temperature data acquired by the thermography 6 is input to the calculation unit 8. The temperature data input to the calculation unit 8 is displayed on the monitor 5a in different colors corresponding to a plurality of defined temperature ranges. Accordingly, the temperature distribution of the surface of the hose 11 can be visually determined. The image data acquired by the camera device 5 and the temperature data acquired by the thermography 6 can alternately be displayed on the monitor 5a or can both be both displayed on the monitor 5a simultaneously.

One or a plurality of thermographies 6 are installed. In this embodiment, two thermographies 6 are installed to allow acquisition of surface temperature data regarding the hose 11 in a side view and surface temperature data regarding the hose 11 in an upper front view. At least any one of the thermographies 6 may be used to acquire surface temperature data regarding the areas where markers 4b are attached. A single thermography 6 can be installed, and the thermography 6 can be movable to a desired position with respect to the hose 11. The movement of the thermography 6 may be controlled by the control unit 9.

The temperature sensor 7 acquires the ambient environmental temperature data regarding the hose 1. The ambient environmental temperature data acquired by the temperature sensor 7 is input to the calculation unit 8. In this embodiment, the hose 1 is disposed inside the thermostatic chamber 10. Accordingly, the temperature of the internal space of the thermostatic chamber 10 is acquired by the temperature sensor 7 as ambient environmental temperature data. The temperature of the internal space of the thermostatic chamber 10 is controlled to a desired temperature by the control unit 9.

An example of a procedure for evaluating the fatigue resistance of the hose 11 using the evaluation system 1 will be described below.

As illustrated in FIGS. 1 and 2, the hose 11 is installed on the fixing frame 2 in a preset shape. The pipe 3a of the pressurization mechanism 3 is connected to the hose 11. The strain gauges 4a and the markers 4b are attached to the surface of the hose 11. Once the setting of the hose 11 is complete, strain data is acquired by the strain gauges 4a, image data regarding the hose 11 is acquired using the camera device 5, surface temperature data is acquired using the thermography 6, and ambient environmental temperature data is acquired using the temperature sensor 7. Each of the data acquired at this time is stored in the calculation unit 8 as initial state data.

Then, the predetermined internal pressure P is repeatedly applied to the hose 11 by the pressurization mechanism 3. The magnitude of the predetermined internal pressure P, the duration of application, and the pressure application cycle are set equivalent to or stricter than the actual use conditions for the hose 11, for example. The application of the predetermined internal pressure P is continued until a preset time elapses, or until the preset number of pressure application cycles is reached, or until the hose 11 is damaged.

During the course of application of the predetermined internal pressure P, for example, at predetermined time intervals (every predetermined time elapsed or every predetermined number of pressure application cycles elapsed) for a predetermined period of time, the strain data is acquired using the strain gauges 4a, image data is acquired using the camera device 5, surface temperature data is acquired using the thermography 6, and ambient environmental temperature data is acquired using the temperature sensor 7. That is, each of the data is acquired with the predetermined internal pressure P repeatedly applied to the hose 11.

In a case where a single camera device 5 and a single thermography 6 are installed, when acquiring respective data by moving the camera device 5 and the thermography 6, from a plurality of desired positions with respect to the hose 11, the respective data can be acquired. Alternatively, with the camera device 5 and the thermography 6 fixed at predetermined positions, the hose 11 (the hose 11, the fixing frame 2, and the pressurization mechanism 3) may be configured to be moved to desired positions. In this configuration as well, from a plurality of desired positions with respect to the hose 11, the respective data can be acquired.

During a single pressure application cycle, when the maximum pressure corresponding to a peak (i.e., application of the predetermined pressure P) is applied, the degree of expansion (expansion displacement in the outer diameter dimension) of the hose 11 is maximized, and the degree of contraction in the longitudinal direction (contraction displacement in the length dimension) is maximized, with the initial state as a point of reference. On the other hand, when the minimum pressure (i.e., applied pressure is zero) is applied, the degree of expansion (expansion displacement in the outer diameter dimension) of the hose 11 is minimized, and the degree of contraction in the longitudinal direction (contraction displacement in the length dimension) is minimized, with the initial state as a point of reference. At any time between when the applied pressure is at the maximum value and when the applied pressure is zero, the degree of expansion and the degree of contraction in the longitudinal direction of the hose 11 are each in an intermediate state between the state where the applied pressure is at the maximum value and the state where the applied pressure is zero.

The hose 11 is fatigued as the number of pressure applications increases, and thus the degree of expansion of the hose 11 and the degree of contraction in the longitudinal direction of the hose 11 change even at the identical internal pressure. Accordingly, even with application of the identical predetermined pressure P, the hose 11 is more fatigued when the number of pressure applications is greater than when the number of pressure applications is small, and thus changes occur in the degree of expansion of the hose 11 and the degree of contraction in the longitudinal direction of the hose 11 over time.

Thus, based on the strain data and image data acquired, a change is determined in the shape of the hose 11 between a plurality of time points at the identical internal pressure (for example, the time when the predetermined internal pressure P is applied, the time when the internal pressure is zero, etc.). Specifically, the strain data obtained between a plurality of time points at the identical internal pressure is used to calculate, as the amount of displacement in the strain data, the degree of expansion of the hose 11 and the degree of contraction in the longitudinal direction of the hose 11, corresponding to a change in the shape of the hose 11. Thus, the degree of local deformation (amount of displacement and direction of deformation) of the surface of the hose 11 in the areas (positions) where the strain gauges 4a are attached can be accurately determined.

Additionally, the image data includes image data regarding the markers 4b, comparison of the image data obtained at the plurality of time points at the identical internal pressure allows calculation of the amount of displacement (the amount of movement) of the markers 4b at the plurality of time points. Thus, the degree of expansion of the hose 11 and the degree of contraction in the longitudinal direction of the hose 11, corresponding to a change in the shape of the hose 11, are calculated as the amount of displacement of the markers 4b. Accordingly, the degree of deformation (amount of displacement and direction of deformation) of the surface of the hose 11 in the areas where the markers 4b are attached can be determined. Using the markers 4b facilitates determination of the degree of deformation of the hose 11 over wider areas than using the strain gauges 4a.

Figure 6:
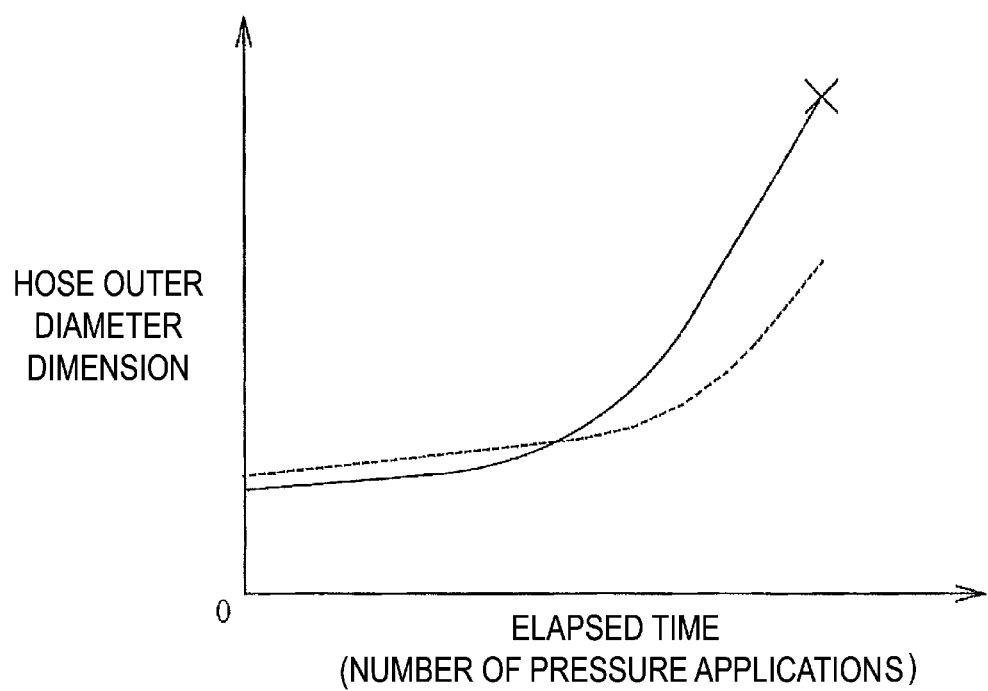
FIG. 6 is a graph showing changes in the outer diameter dimension of the hose over time in a case where predetermined internal pressure is applied to the hose.

FIG. 6 illustrates changes in the outer diameter dimension of the hose over time when the predetermined internal pressure P is applied. A solid line indicates data regarding the area of the hose 11 at or near the hose fitting 16, and a cross mark indicates that the hose 11 is damaged. A dashed line indicates data regarding the area of the longitudinally central portion of the hose 11.

Figure 7:
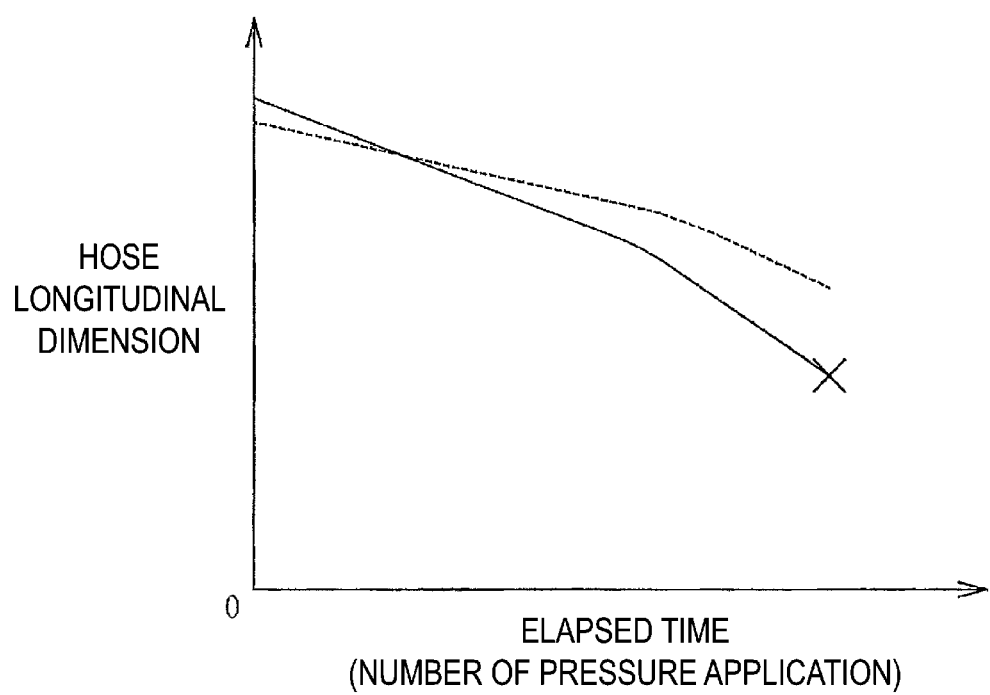
FIG. 7 is a graph showing changes in the longitudinal dimension of the hose over time in a case where predetermined internal pressure is applied to the hose.

FIG. 7 illustrates changes in the longitudinal dimension of the hose over time when the predetermined internal pressure P is applied. A solid line indicates data regarding the area of the hose 11 at or near the hose fitting 16, and a cross mark indicates that the hose 11 is damaged. A dashed line indicates data regarding the area of the longitudinally central portion of the hose 11.

The area of the hose 11 at or near the hose fitting 16 is subjected to a crimping force acting thereon and affected by the hose fitting 16, thus having a large difference in rigidity from its periphery. Thus, the hose 11 is likely to be damaged in this area due to the repeated pressure applications. Thus, when the evaluation described above is performed with the hose fitting 16 attached to at least one end portion of the hose 11, fatigue resistance of the hose 11 can be evaluated with the actual use state of the hose 11 approximated.

According to an embodiment of the present invention, as described above, changes in the shape of the hose 11 calculated based on the strain data and the image data allow determination of changes in the degree of deformation of the hose 11 over time due to repeated application of internal pressure. Accordingly, the area of the hose 11 where the hose 11 is relatively significantly deformed over time can be identified, and the degree of deformation at which the hose is damaged can be identified. This enables, for the fatigue resistance of the hose 11, determination of how the hose 11 is deformed during the course of fatigue and how the deformation progresses. By further analyzing and studying the results of the determination, an effective measure for improving the fatigue resistance of the hose 11 can be easily taken.

Changes in degree of local deformation of the surface of the hose 11 over time may be determined based on the strain data, and changes in the degree of deformation over wider areas of the surface of the hose 11 over time may be determined based on the image data. With the strain gauge 4a attached to the surface of the hose 11 in the areas where the markers 4b are attached as in this embodiment, the interrelationship between the amount of displacement of the markers 4b and the amount of displacement in the strain data can be accurately determined. With the interrelationship successfully determined, for example, in a case where the identical evaluation of fatigue resistance is repeatedly performed, any of the strain gauges 4a and the markers 4b attached to the surface of the hose 11 can be omitted.

In this embodiment, during the course of repeated application of the predetermined internal pressure P, the surface temperature data regarding the hose 11 is acquired by the thermography 6. Based on the surface temperature data acquired by the thermography 6, the calculation unit 8 calculates a change in the surface temperature between a plurality of time points at the identical internal pressure. Then, the calculation unit 8 calculates the relationship between a change in the surface shape of the hose 11 and a change in the surface temperature between a plurality of time points at the identical internal pressure.

For example, the calculation unit 8 calculates the relationship between the rate of change in the surface shape of the hose 11 and the rate of change in the surface temperature, between a plurality of time points when the predetermined internal pressure P is applied. Accordingly, the interrelationship between the rate of change in the surface shape of the hose 11 and the rate of change in the surface temperature can be determined. For example, the area of the hose 11 where the hose 11 is likely to be damaged tends to generate more heat and to have higher surface temperature than its periphery. Consequently, determining the interrelationship allows identification of the area of the hose 11 where the hose 11 is likely to be damaged and enables estimation of the period of time when the hose 11 may be damaged.

Furthermore, in this embodiment, during the courses of repeated application of the predetermined internal pressure P, the temperature sensor 7 acquires the ambient environmental temperature data regarding the hose 11. Based on the ambient environmental temperature data acquired by the temperature sensor 7, the calculation unit 8 calculates a change in ambient environmental temperature data between a plurality of time points at the identical internal pressure. Then, the calculation unit 8 calculates the relationship between the change in the surface temperature of the hose 11 and the change in the ambient environmental temperature, between the plurality of time points at the identical internal pressure. Accordingly, the effect of the peripheral environmental temperature of the hose 11 on the changes in the surface temperature of the hose 11 can be determined. In general, an interrelationship can be determined that indicates a tendency for the surface temperature of the hose 11 to increase consistently with the ambient environmental temperature. Thus, this interrelationship can be used to exclude the effect of the changes in the ambient environmental temperature on the changes in the surface temperature of the hose 11. In other words, by making corrections on the surface temperature data based on the ambient environmental temperature data, the changes in the surface temperature caused by the heat generated by the hose 11 itself are easily determined.

Figure 8:
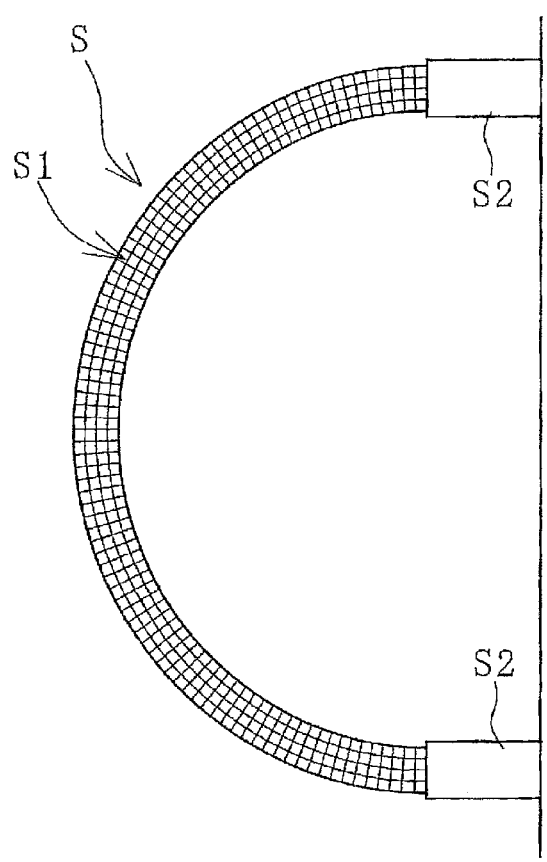
FIG. 8 is an explanatory diagram illustrating an FEM analysis model for the hose in a side view.

Desirably, the areas where the strain gauges 4a and the markers 4b are attached correspond to areas in which greater strain (maximum strain) occurs during the actual use of the hose 11. Thus, as illustrated in FIG. 8, strain data regarding the hose 11 when the predetermined internal pressure P is applied to the hose 11 is calculated in advance by the calculation unit 8, using an FEM analysis model S of the hose 11. Then, the strain gauges 4a and the markers 4b are preferably attached to the surface of the hose 11 in the area corresponding to the area where the calculated strain data exhibits the maximum value.

In the FEM analysis model S in FIG. 8, the surface of a hose S1 is divided into a large number of meshes, and hose fittings S2 are set to be undeformable rigid bodies and fixed to predetermined positions. The calculation unit 8 receives, for an FEM analysis, Young's modulus, Poisson's ratio, shape data, and the like for each of rubber members (inner surface layer 12 and outer surface layer 15) and reinforcing wires 14 (reinforcing layer 13) constituting the hose 11.

In addition, the FEM analysis model S is used to calculate strain data in advance regarding the areas where the strain gauges 4a are attached, when the predetermined internal pressure P is applied to the hose 11. Then, the calculated strain data in advance is compared with strain data acquired by the strain gauges 4a when the predetermined internal pressure P is applied to the hose 11, and the difference between both strain data compared is determined. The magnitude of the difference between both strain data indicates the degree of analysis accuracy of the FEM analysis, and thus settings for the FEM analysis model S are preferably improved to reduce the difference.

REFERENCE SIGNS LIST

1 Hose fatigue resistance evaluation system
2 Fixing frame
3 Pressurization mechanism
3a Pipe
3b Pressure sensor
4a Strain gauge
4b Marker
5 Camera device
5a Monitor
6 Thermography
7 Temperature sensor
8 Calculation unit
9 Control unit
10 Thermostatic chamber
11 Hose
12 Inner surface layer
13 (13a, 13b, 13c, 13d) reinforcing layer
14 Reinforcing wire
15 Outer surface layer
16 Hose fitting
CL Hose axis
L Pressurized fluid
S Simulation model
S1 Hose
S2 Hose fitting

The invention claimed is:

1. A hose fatigue resistance evaluation system comprising:
   a fixing frame on which a hose to be evaluated is fixed and installed in a preset shape; and a pressurization mechanism repeatedly applying predetermined internal pressure to the hose, the hose fatigue resistance evaluation system further comprising:
   a strain gauge and a marker attached to a surface of the hose; a camera device capturing an image of an external shape of the hose; and a calculation unit into which strain data acquired by the strain gauge and image data acquired by the camera device are input,
   based on the strain data and the image data, the calculation unit being configured to calculate a degree of deformation of a shape of the hose between a plurality of time points at identical internal pressure.

2. The hose fatigue resistance evaluation system according to claim 1, comprising a thermography acquiring surface temperature data regarding the hose, wherein the calculation unit is configured to calculate, based on the surface temperature data, a degree of change in the surface temperature between the plurality of time points at the identical internal pressure and to calculate a relationship between a degree of change in the shape and the degree of change in the surface temperature between the plurality of time points at the identical internal pressure.

3. The hose fatigue resistance evaluation system according to claim 2, further comprising a temperature sensor acquiring ambient environmental temperature data regarding the hose, wherein the calculation unit is configured to calculate a relationship between the ambient environmental temperature data and the surface temperature data.

4. The hose fatigue resistance evaluation system according to claim 3, wherein an area in which the strain gauge is attached is set within the area of the surface in which the marker is attached.

5. The hose fatigue resistance evaluation system according to claim 2, wherein an area in which the strain gauge is attached is set within the area of the surface in which the marker is attached.

6. The hose fatigue resistance evaluation system according to claim 2, further comprising a hose fitting attached to at least one end portion of the hose, wherein the hose is installed on the fixing frame via the hose fitting.

7. The hose fatigue resistance evaluation system according to claim 2, wherein the area of the surface in which the strain gauge and the marker are attached is set in an area of the hose at or near the hose fitting and in an area of a longitudinally central portion of the hose.

8. The hose fatigue resistance evaluation system according to claim 2, wherein
   an FEM analysis model for the hose is used to calculate in advance strain data generated on a surface of the hose during a course of application of the predetermined internal pressure to the hose and to input the strain data to the calculation unit, and
   based on the strain data calculated through an FEM analysis and the strain data acquired by the strain gauge, the calculation unit is configured to calculate a difference between the strain data obtained through the FEM analysis and the strain data acquired by the strain gauge at the identical internal pressure in the area of the surface of the hose in which the strain gauge is attached.

9. The hose fatigue resistance evaluation system according to claim 3, further comprising a hose fitting attached to at least one end portion of the hose, wherein the hose is installed on the fixing frame via the hose fitting.

10. The hose fatigue resistance evaluation system according to claim 3, wherein the area of the surface in which the strain gauge and the marker are attached is set in an area of the hose at or near the hose fitting and in an area of a longitudinally central portion of the hose.

11. The hose fatigue resistance evaluation system according to claim 3, wherein
    an FEM analysis model for the hose is used to calculate in advance strain data generated on a surface of the hose during a course of application of the predetermined internal pressure to the hose and to input the strain data to the calculation unit, and
    based on the strain data calculated through an FEM analysis and the strain data acquired by the strain gauge, the calculation unit is configured to calculate a difference between the strain data obtained through the FEM analysis and the strain data acquired by the strain gauge at the identical internal pressure in the area of the surface of the hose in which the strain gauge is attached.

12. The hose fatigue resistance evaluation system according to claim 1, wherein an area in which the strain gauge is attached is set within the area of the surface in which the marker is attached.

13. The hose fatigue resistance evaluation system according to claim 12, further comprising a hose fitting attached to at least one end portion of the hose, wherein the hose is installed on the fixing frame via the hose fitting.

14. The hose fatigue resistance evaluation system according to claim 12, wherein the area of the surface in which the strain gauge and the marker are attached is set in an area of the hose at or near the hose fitting and in an area of a longitudinally central portion of the hose.

15. The hose fatigue resistance evaluation system according to claim 12, wherein
    an FEM analysis model for the hose is used to calculate in advance strain data generated on a surface of the hose during a course of application of the predetermined internal pressure to the hose and to input the strain data to the calculation unit, and
    based on the strain data calculated through an FEM analysis and the strain data acquired by the strain gauge, the calculation unit is configured to calculate a difference between the strain data obtained through the FEM analysis and the strain data acquired by the strain gauge at the identical internal pressure in the area of the surface of the hose in which the strain gauge is attached.

16. The hose fatigue resistance evaluation system according to claim 1, further comprising a hose fitting attached to at least one end portion of the hose, wherein the hose is installed on the fixing frame via the hose fitting.

17. The hose fatigue resistance evaluation system according to claim 16, wherein the area of the surface in which the strain gauge and the marker are attached is set in an area of the hose at or near the hose fitting and in an area of a longitudinally central portion of the hose.

18. The hose fatigue resistance evaluation system according to claim 16, wherein
    an FEM analysis model for the hose is used to calculate in advance strain data generated on a surface of the hose during a course of application of the predetermined internal pressure to the hose and to input the strain data to the calculation unit, and based on the strain data calculated through an FEM analysis and the strain data acquired by the strain gauge, the calculation unit is configured to calculate a difference between the strain data obtained through the FEM analysis and the strain data acquired by the strain gauge at the identical internal pressure in the area of the surface of the hose in which the strain gauge is attached.

19. The hose fatigue resistance evaluation system according to claim 1, wherein the area of the surface in which the strain gauge and the marker are attached is set in an area of the hose at or near the hose fitting and in an area of a longitudinally central portion of the hose.

20. The hose fatigue resistance evaluation system according to claim 1, wherein
- an FEM analysis model for the hose is used to calculate in advance strain data generated on a surface of the hose during a course of application of the predetermined internal pressure to the hose and to input the strain data to the calculation unit, and
- based on the strain data calculated through an FEM analysis and the strain data acquired by the strain gauge, the calculation unit is configured to calculate a difference between the strain data obtained through the FEM analysis and the strain data acquired by the strain gauge at the identical internal pressure in the area of the surface of the hose in which the strain gauge is attached.

* * * * *